(No Model.) 3 Sheets—Sheet 3.

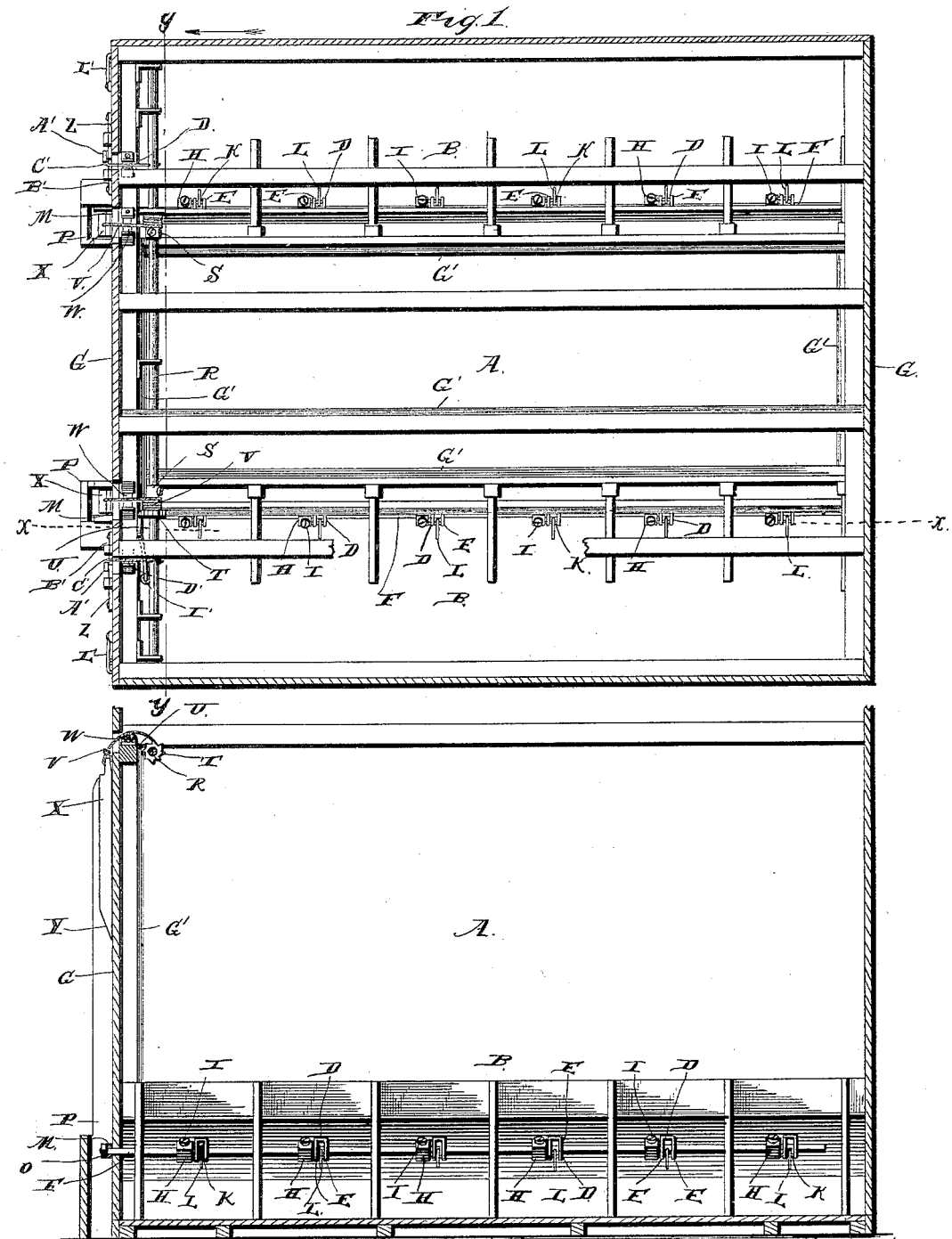

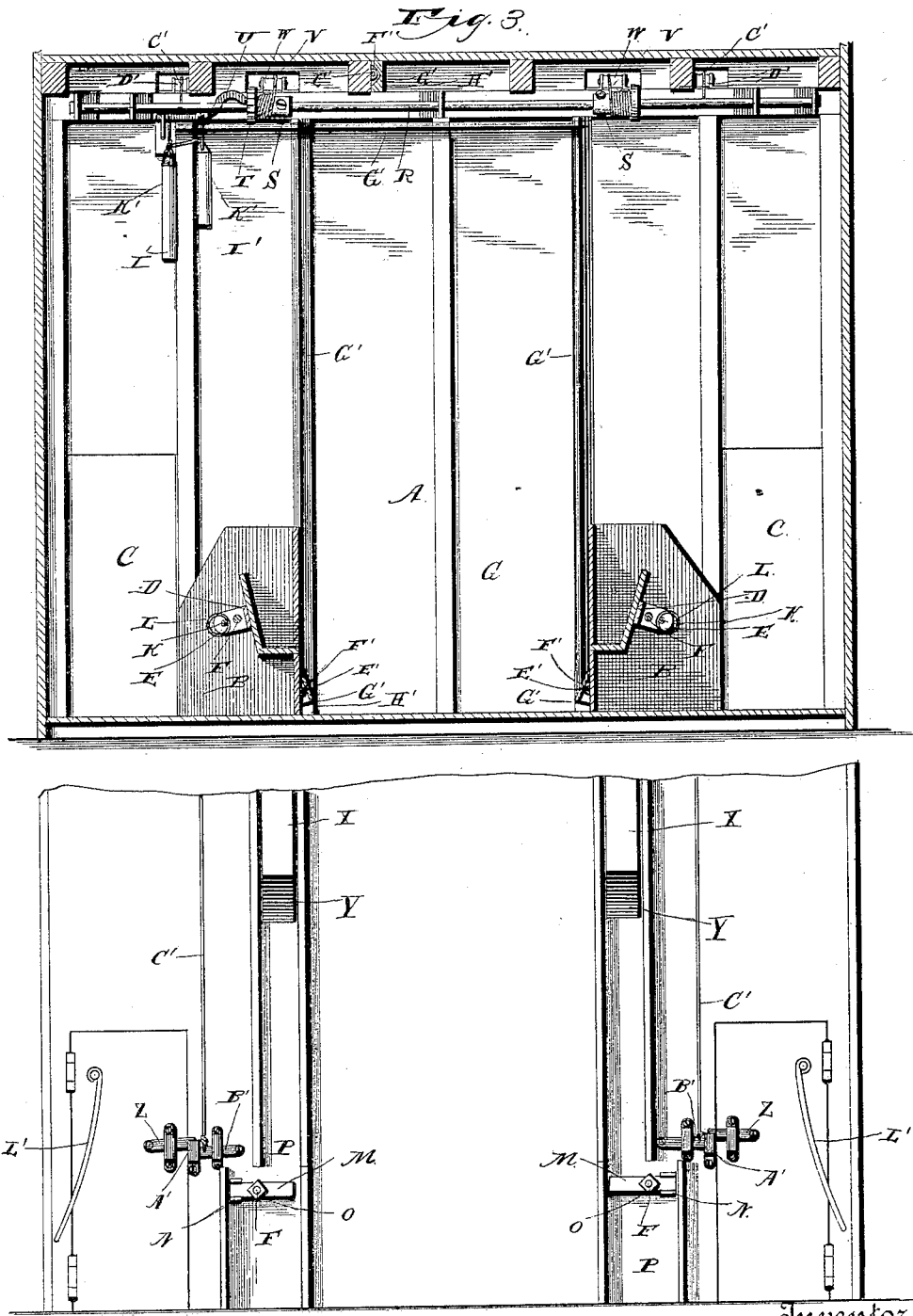

E. L. FOX.
HORSE RELEASING DEVICE.

No. 398,827. Patented Mar. 5, 1889.

Witnesses
Geo. G. Thorpe
J. W. Garner

Inventor.
Ellis F. Fox.
By his Attorneys.

UNITED STATES PATENT OFFICE.

ELLIS L. FOX, OF SHANNONVILLE, PENNSYLVANIA.

HORSE-RELEASING DEVICE.

SPECIFICATION forming part of Letters Patent No. 398,827, dated March 5, 1889.

Application filed November 20, 1888. Serial No. 291,372. (No model.)

*To all whom it may concern:*

Be it known that I, ELLIS L. FOX, a citizen of the United States, residing at Shannonville, in the county of Montgomery and State of Pennsylvania, have invented a new and useful Improvement in Horse-Releasing Apparatus, of which the following is a specification.

My invention relates to an improvement in horse-releasing apparatus for barns and stables; and it consists in the peculiar construction and novel combination of devices, that will be more fully set forth hereinafter, and particularly pointed out in the claims.

Figure 5:
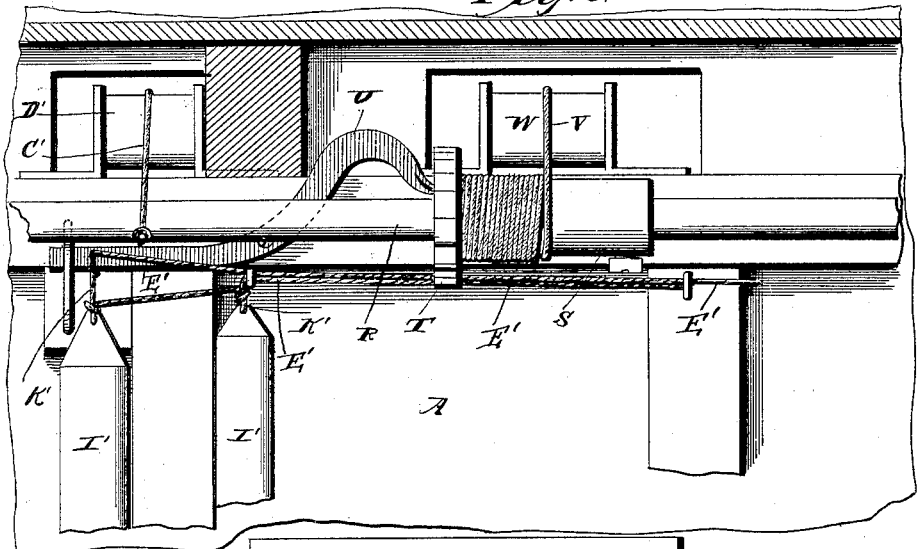
Figure 6:
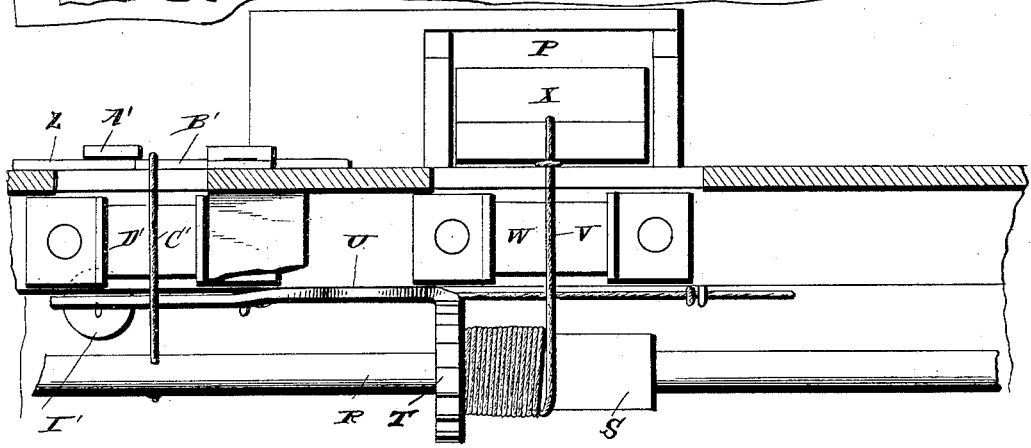
Figure 7:
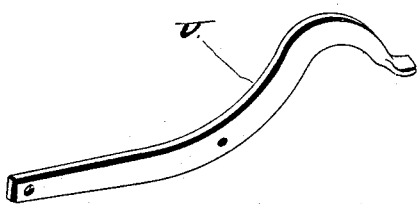

In the accompanying drawings, Figure 1 is a plan view of a stable or barn provided with the releasing apparatus embodying my improvement. Fig. 2 is a sectional view of the same, taken on the line $xx$ of Fig. 1. Fig. 3 is a vertical transverse sectional view taken on the line $yy$ of Fig. 1, and looking in the direction of the arrow. Fig. 4 is an end elevation. Figs. 5 and 6 are detail views of parts of Figs. 3 and 1. Fig. 7 is a detail perspective view of the lever U.

A represents a barn or stable, on opposite sides of which are arranged rows of stalls B.

C represents doors through which the horses pass in entering or leaving the stalls. Secured to the manger or to a suitable support at the head of each stall is a U-shaped bracket, D, having parallel arms E.

F represents endwise-moving rods, which extend transversely across the entire series of stalls and are guided in the brackets D. One end of each rod extends through one of the end walls, G, of the barn or stable.

H represents blocks, which are secured to the rods F by set-screws I, and each block has on one side a laterally-projecting rod or arm, K, adapted to pass through openings in the arms E of the adjacent bracket D. Rings L are adapted to engage the said rods or arms K, and the halters of the animals are fastened to the said rings. The rods F are normally moved inward, so that the rods or arms K retain the rings fast between the arms E of the brackets, as shown in solid lines in Fig. 1.

M represents cross-heads, which are mounted in brackets N on the end wall of the barn or stable, and said heads are provided with transverse openings, through which the projecting ends of the rods F extend. Adjusting-nuts O engage the threaded extremities of the said rods, and are arranged on opposite sides of the cross-heads, and thereby serve to connect the rods thereto. The levers M and the projecting ends of the rods are incased in boxes P, which are arranged vertically on the front end of the barn or stable.

Journaled in bearings on the inner side of the end wall of the barn, at a suitable distance from the floor, is a shaft, R, to which is attached a pair or more of drums, S, there being one drum for each series of stalls. One of the drums S is provided at one end with a ratchet, T, the same being adapted to be engaged by a lever or detent, U, to prevent the shaft from rotating. Ropes V are attached to the said drums, pass over suitable sheaves, W, and to the outer end of the said ropes are secured weights X, which are guided in the vertical boxes P and have their lower ends provided with wedge-shaped points Y. Each door C has a latch, Z, adapted to engage a keeper, A'.

B' represents trip-levers, which are pivoted on the end wall of the barn or stable, engage the keepers A', and have their outer ends supporting the free ends of the latches Z. To each trip-lever B' is attached a cord, C', the said cords passing over suitable guide-pulleys, D', and being attached to the shaft R and adapted to be coiled thereon.

E' represents cords that are arranged around the sides of the barn, or at the heads of the stalls, or under the rafters, or at any other desired part of the barn or stable that is most likely to become ignited, the said cords being guided through loops or keepers F', and covered by boards G', secured on wedge-shaped cleats or blocks H' in such manner as to conceal the cords from sight and prevent them from being handled or struck by animals, persons, or objects in the barn. The free end of each cord E' is attached to a weight, I', the said weights being suspended at a suitable place in the barn or stable, and each of the said weights is also connected to the detent or trip lever U by an independent slack cord, K'. The cords E' and K' should be made of hemp or other suitable combustible material.

The apparatus is in its initial adjustment when the ropes V are wound on the drums S, so as to raise the weights X to the upper end of the boxes P and cause the cords C' to be unwound from the shaft R, so as to permit the trip-levers B' to be lowered sufficiently to enable the latches Z to engage the keepers A' when the doors C are closed. Each of the said doors C has a torsion-spring, L', or other device to open the same when the latch is tripped. The rods F, as previously stated, are normally moved inward to retain the rings L between the arms of the guide-brackets D, thereby causing the cross-heads M to move to a position parallel or substantially so with relation to the opposing end wall of the barn or stable.

In the event that a fire breaks out in the barn or stable it will almost immediately burn one of the ropes E' and cause the same to part, and thereby drop the weight I', attached thereto, and cause the cord K', connecting the weight to the detent U, to trip the latter from the ratchet T, and the weights X will then descend by their own gravity, cause the rope S to rotate the shaft R and coil up the cords C', and thereby cause the said cords to raise the levers B' and trip the latches Z, when the springs L' will instantly throw the doors C open to permit the animals to escape from the barn. Just before the weights X reach the bottoms of the guide-boxes P the points Y thereof engage the cross-heads M and move the latter outward, thus causing the said cross-heads to move the rods F a sufficient distance to cause their arms K to disengage the rings L, and thereby release the animals from their stalls.

An alarm apparatus may be connected to the shaft R, or to one of the cords C', to sound an alarm, as will be readily understood.

Having thus described my invention, I claim—

1. The combination, with the releasing mechanism for detaching the horses in their stalls, of the shaft R, having the drums S and ratchet-wheel T, the cords or ropes attached to the said drums, the weights X, attached to said ropes and adapted to operate the releasing mechanism, the detent engaging the ratchet-wheels on the shaft, the combustible cords, the weights I', suspended thereby, and the slack cords connecting the said weights to the detent, whereby when one of the combustible cords is parted its weight I' will drop and trip the detent from the shaft R, for the purpose set forth, substantially as described.

2. The combination of the doors having the latches, the levers B', to trip the latches, the shaft R, having a ratchet-wheel, the detent to engage the same, the weights to rotate the shaft when released, the cords C', connecting the levers B' to the shaft, the combustible cords E', and the weights I', suspended thereby, the said weights being connected to the detents, substantially as described.

3. The combination, with the releasing mechanism having the movable rods F, of the cross-heads M, attached to the said rods, the shaft R, having the ratchet-wheel, the detent to engage the same, the combustible cords, the weights suspended thereby, the slack cords connecting the said weights to the detent, for the purpose set forth, the guide-boxes P, the cords V, wound on drums on shaft R, and the weights X, guided in the boxes P and attached to said cords V, the said weights having the wedge-shaped points Y at their lower ends adapted to engage the cross-heads when they descend, and thereby to operate the rods F, substantially as described.

In testimony that I claim the foregoing as my own I have hereto affixed my signature in presence of two witnesses.

ELLIS L. FOX.

Witnesses:
H. B. CONRAD,
HARRY W. AKINS.